US010107627B2

(12) United States Patent
Aboutalib et al.

(10) Patent No.: US 10,107,627 B2
(45) Date of Patent: Oct. 23, 2018

(54) ADAPTIVE NAVIGATION FOR AIRBORNE, GROUND AND DISMOUNT APPLICATIONS (ANAGDA)

(71) Applicant: NORTHROP GRUMMAN SYSTEMS CORPORATION, Falls Church, VA (US)

(72) Inventors: Omar Aboutalib, Diamond Bar, CA (US); Bich M. Thai, Porter Ranch, CA (US); Alex C. Fung, Arcadia, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 129 days.

(21) Appl. No.: 15/453,200

(22) Filed: Mar. 8, 2017

(65) Prior Publication Data

US 2018/0259341 A1   Sep. 13, 2018

(51) Int. Cl.
*G01C 21/16* (2006.01)
*G08G 5/02* (2006.01)
(Continued)

(52) U.S. Cl.
CPC ............ *G01C 21/165* (2013.01); *B63B 49/00* (2013.01); *B64C 39/024* (2013.01); *F41G 7/008* (2013.01);
(Continued)

(58) Field of Classification Search
CPC .... G01C 21/165; G01C 21/005; G06T 7/579; G06T 7/38; G06T 7/337; G06T 7/248;
(Continued)

(56) References Cited

U.S. PATENT DOCUMENTS 6,792,363 B1 * 9/2004 Bye ...................... G05D 1/0005
701/2
8,065,074 B1   11/2011 Liccardo
(Continued)

FOREIGN PATENT DOCUMENTS

EP   2 378 248 A2   1/2011

*Primary Examiner* — Gertrude Arthur Jeanglaude
(74) *Attorney, Agent, or Firm* — John A. Miller; Shumaker, Loop & Kendrick, LLP

(57) ABSTRACT

An adaptive navigation system for airborne, ground and dismount applications. The system performs adaptive fusion of all sensed signals, information sources, and databases that may be available on a single or multiple cooperative platforms to provide optimal Positioning, Navigation, and Timing (PNT) state. To reduce error building over time, the system incorporates the concept of geo-registration fusion into the ANAGDA filter. The architecture of the ANAGDA filter consists of user/application configurable functionalities in hierarchical layers. The sensing layer senses the environment and contains the required databases such as surveyed landmarks, and Digital Terrain Elevation Data/Digital Elevation Model (DTED/DEM). The processing layer has a Smart Sensor Resource Manager which is a performance-based sensor/feature selection module. The measurement abstraction layer isolates the filter from hardware specifics. The fusion layer performs the Inertial Measurement Unit (IMU) data integration with sensor measurements, and feature fusion.

20 Claims, 13 Drawing Sheets

(51) Int. Cl.
*B64C 39/02* (2006.01)
*G01C 21/00* (2006.01)
*B63B 49/00* (2006.01)
*G08G 5/00* (2006.01)
*F41G 7/00* (2006.01)
*G06T 7/246* (2017.01)
*G06T 7/579* (2017.01)
*G06T 7/33* (2017.01)
*G06T 7/38* (2017.01)
*G06T 7/73* (2017.01)
*G05D 1/00* (2006.01)

(52) U.S. Cl.
CPC ............ *G01C 21/005* (2013.01); *G06T 7/248* (2017.01); *G06T 7/337* (2017.01); *G06T 7/38* (2017.01); *G06T 7/579* (2017.01); *G06T 7/74* (2017.01); *G08G 5/0047* (2013.01); *G08G 5/025* (2013.01); *B63B 2213/02* (2013.01)

(58) Field of Classification Search
CPC ... B63B 49/00; B63B 2213/02; B64C 39/024; F41G 7/008; G08G 5/0047; G08G 5/025
USPC .............................................. 701/2, 3, 7, 36
See application file for complete search history.

(56) References Cited

U.S. PATENT DOCUMENTS 9,857,181 B2 * 1/2018 Song ....................... G01C 21/30
2005/0040280 A1 * 2/2005 Hua ........................ F42B 15/01
244/3.1

* cited by examiner

ADAPTIVE NAVIGATION FOR AIRBORNE, GROUND AND DISMOUNT APPLICATIONS (ANAGDA)

BACKGROUND

Field

This invention relates generally to a navigation system and, more particularly, to methods and systems for adaptive navigation for airborne, ground, and dismount (soldiers) applications, where the navigation system is operable in both GPS-available and GPS-denied environments, and the system performs adaptive filtering and fusion of all sensed signals, information sources, and databases that may be available on a single or multiple cooperative platforms to compute a positioning, navigation, and timing (PNT) state.

Discussion

Satellite-based technology such as Global Positioning System (GPS) is now commonly used for navigation in military applications, including aircraft and ship navigation, weapon deployment, aircraft-to-ship landings at sea, and others. GPS is also widely used by commercial operations such as airlines and trucking companies, and by private individuals. GPS has become popular because of its reliability, accuracy and low cost. However, for military navigation applications in particular, there is a vulnerability to attacks on key nodes of the GPS. It has therefore been recognized that military operations need viable alternate navigation solutions for usage in non-GPS (or "GPS-denied") environments.

However, existing state-of-the art methods in GPS-denied navigation have serious shortcomings in terms of error-building over time, high dependency on the platform and on-board sensor type, high acquisition and maintenance cost, extensive pre-mission planning, and large size, weight, and power (SWaP) that is incompatible with deployment on small military platforms. These shortcomings have resulted in some types of aircraft, ships and weapons not being usable in GPS-denied environments. The shortcomings have also resulted in long development lead times and high costs for alternate navigation solutions to be hosted on multiple platforms, and/or systems with unacceptably low accuracy.

There is therefore a need for a navigation solution which is operable in GPS-denied environments, and also incorporates GPS data if available, which can be used across a wide variety of air, land and sea platforms, and which provides the best possible navigation state information based on the available sensory data.

SUMMARY

The present invention discloses and describes an adaptive navigation system for airborne, ground and dismount applications. The system performs adaptive fusion of all sensed signals, information sources, and databases that may be available on a single or multiple cooperative platforms to provide optimal Positioning, Navigation, and Timing (PNT) state. To reduce error building over time, the system incorporates the concept of geo-registration fusion into the ANAGDA filter. The architecture of the ANAGDA filter consists of user/application configurable functionalities in hierarchical layers. The sensing layer senses the environment and contains the required databases such as surveyed landmarks, and Digital Terrain Elevation Data/Digital Elevation Model (DTED/DEM). The processing layer has a Smart Sensor Resource Manager which is a performance-based module for selecting the appropriate sensor/feature. The measurement abstraction layer isolates the filter from hardware specifics. The fusion layer performs the Inertial Measurement Unit (IMU) data integration with sensor measurements, and feature fusion.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an adaptive navigation system for airborne, ground and dismount applications is merely exemplary in nature, and is in no way intended to limit the invention or its applications or uses.

Navigation at sea has been practiced for centuries, based primarily on celestial observations, a magnetic compass and a clock. In the past century, aircraft navigation added new techniques which were more suitable for the shorter timescales of flight—including deduced reckoning ("dead reckoning") based on known landmarks such as roads, railroad tracks and towns. Eventually, radio-based techniques were developed and most recently satellite-based techniques. With the advent and full deployment of the Global Positioning System (GPS), lightweight and inexpensive receivers are available which can provide reliable and accurate navigation information.

However, in military applications, especially in unfriendly territory, there is a vulnerability to attacks on key nodes of the GPS. It has therefore been recognized that military operations need viable alternate navigation solutions for usage in non-GPS (or "GPS-denied") environments. Existing state-of-the art methods in GPS-denied navigation have serious shortcomings in terms of error-building over time, high dependency on the platform and on-board sensor type, high acquisition and maintenance cost, extensive pre-mission planning, and large size, weight, and power (SWaP) that is incompatible with deployment on small military platforms.

Military applications for navigation take many forms—including everything from an aircraft flying from a fixed-base location to a stationary destination and back again, to an individual soldier finding his or her way through jungle or mountainous terrain. In addition, some of the most challenging military navigation applications are presented in shipboard landing of aircraft (discussed later), and in weapon deployment.

Figure 1:
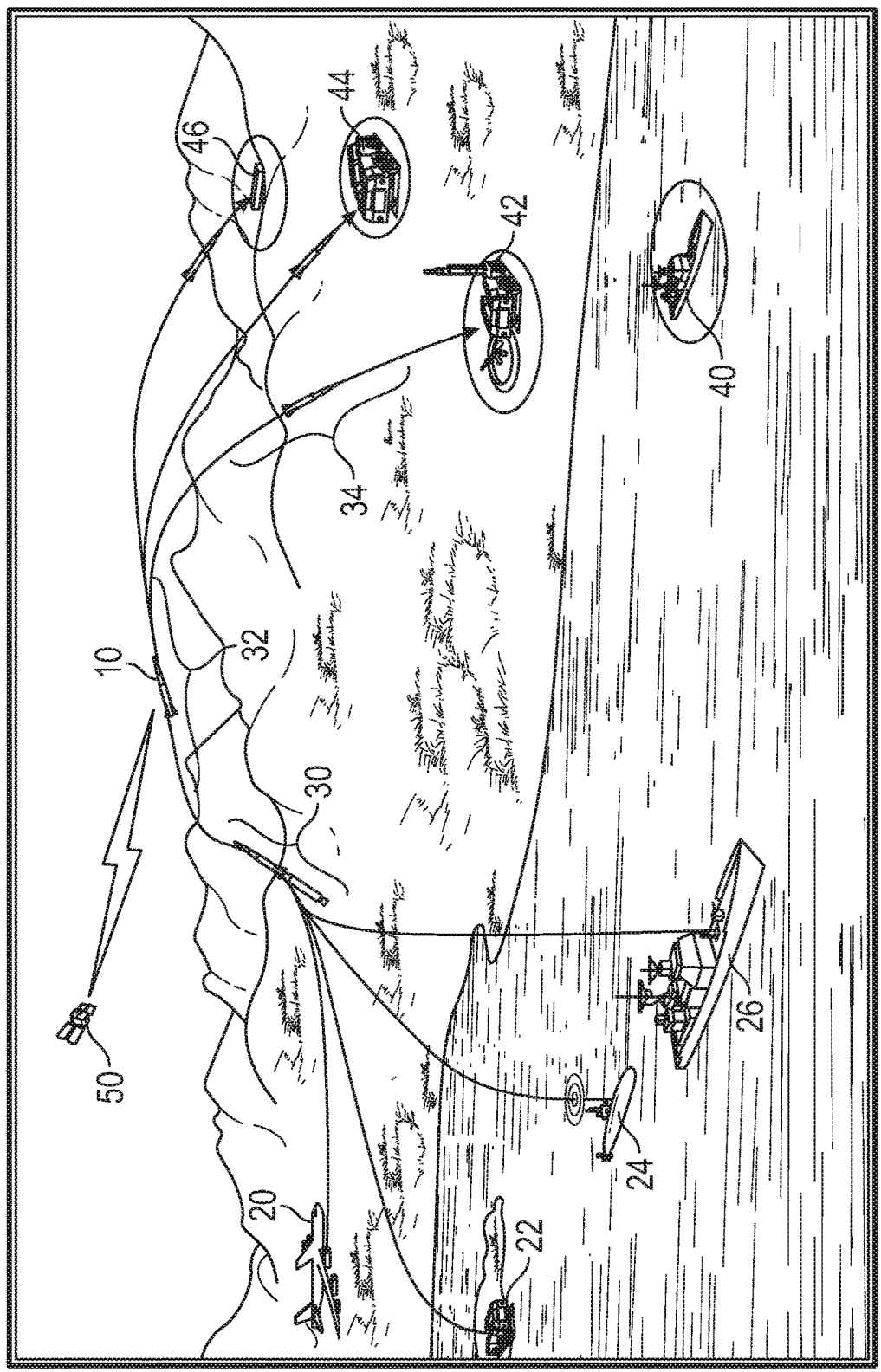
FIG. 1 is an illustration of a military weapon being launched from one of several possible platforms and navigating to one of several possible targets, showing many different navigation scenarios and challenges.

FIG. 1 is an illustration of a military weapon 10 being launched from one of several possible platforms and navigating to one of several possible targets, showing many different navigation scenarios and challenges. The weapon 10 may be launched from an aircraft 20, from a fixed or mobile ground-based pad 22, from a submarine 24 or from a surface ship 26. Regardless of the launch platform, the weapon 10 may undergo a boost, acceleration and climb phase (denoted at 30), a high-mach cruise phase 32 and a terminal dive phase 34.

The weapon 10 may be destined for a surface ship or submarine 40, which of course may be moving, a relocatable ground-based target 42, a moving vehicle 44 or a fixed target 46. The fixed target 46 may be a hardened or underground facility requiring high speed weapon strike with extreme accuracy.

A satellite 50 is shown communicating with the weapon 10 in flight. The satellite 50 may be a GPS satellite (or many GPS satellites) capable of providing reliable navigation information. However, as discussed above, GPS may be unavailable in some military scenarios. Thus, for the purposes of this discussion, the satellite 50 may be a different type of communications satellite, or an aircraft, capable of providing other data to the weapon 10 such as post-launch target movement updates.

Inertial measurement units (IMUs) have been used for decades, and IMUs built with inexpensive components have been developed in recent years, resulting in the possibility of having an IMU on almost any military aircraft, vehicle or weapon. However, IMUs, which measure multi-axis accelerations and integrate the acceleration signals to obtain velocity and position, suffer from cumulative error. Thus, IMU-based navigation alone is not likely to be able to deliver a weapon or vehicle to its intended target with sufficient accuracy. As will be discussed in detail below, different types of vehicles (weapons, aircraft, ships, etc.) will typically have different types of sensors and navigation-capable systems onboard to augment the IMU.

Furthermore, although a vehicle such as an aircraft may have onboard radar and other transceiver systems useful for navigation, the vehicle may need to operate in a stealth mode where it does not transmit radio signals which may give away its presence and location. This stealth consideration also affects the choice of sensors which may be available for navigation on any particular mission. Considering the many weapon-delivery scenarios represented in FIG. 1, and the additional navigation challenges presented by aircraft, vehicles, ships and personnel, it is clear that there is a need for a navigation solution which is operable in GPS-denied environments, and also incorporates GPS data if available, which can be used across a wide variety of air, land and sea platforms, and which provides the best possible navigation state information based on the available sensor data.

Figure 2:
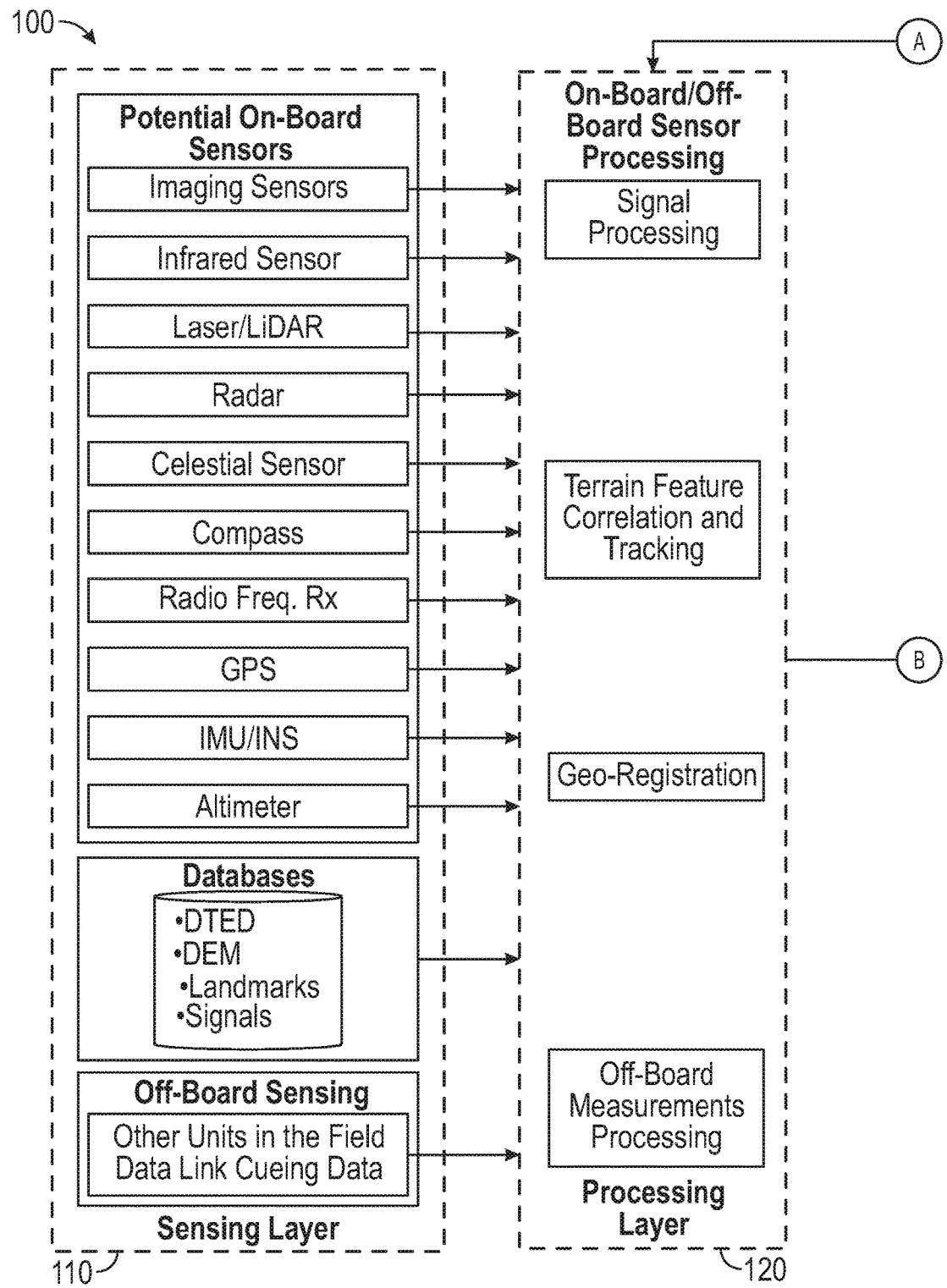
FIG. 2 is an architecture diagram of an adaptive navigation system for airborne, ground and dismount applications, according to an embodiment of the present invention.
Figure 2:
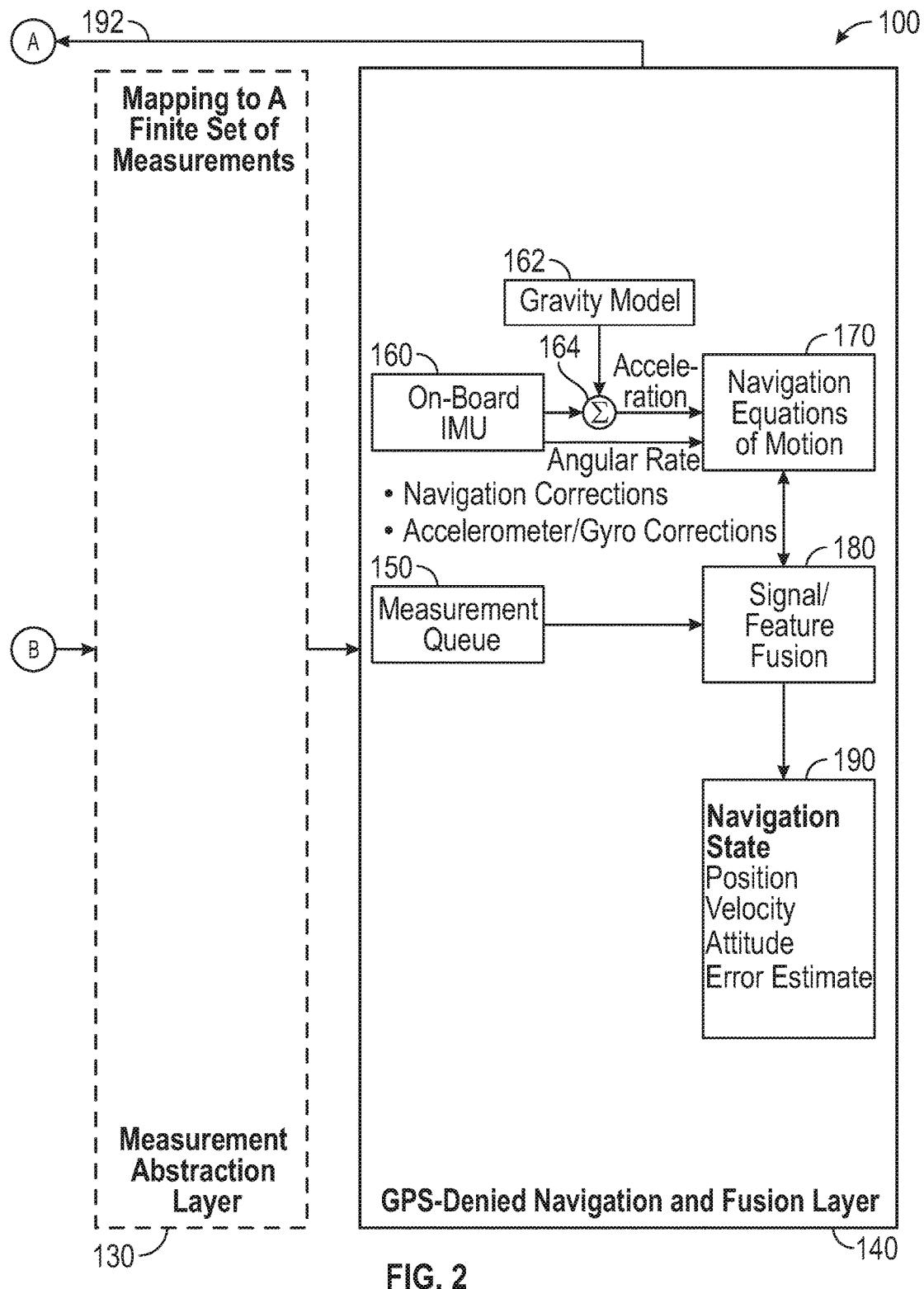

FIG. 2 is an architecture diagram of a system 100 for providing Adaptive Navigation for Airborne, Ground and Dismount Applications (ANAGDA), according to an embodiment of the present invention. (In military terminology, "dismount" refers to an individual soldier who is not onboard a vehicle, ship or aircraft.) The ANAGDA system 100 has been designed and developed to meet the needs discussed above—including making use of any and all available sensor data, in GPS and non-GPS environments, and fusing the available sensor data with IMU-based navigation information to provide a navigation state.

The ANAGDA system 100 performs adaptive fusion of all sensed signals, information sources, and databases that may be available on a single platform or multiple cooperative platforms to provide an optimal Positioning, Navigation, and Timing (PNT) state. ANAGDA is a software solution that is sensor and platform agnostic. To reduce error building over time, the concept of geo-registration fusion is incorporated into the ANAGDA filter. ANAGDA uses three different types of features; unknown features of opportunity to provide attitude fixes, and landmark and/or geo-registered features to provide position fixes. ANAGDA provides optimal spatial and temporal fusion to maximize synergy among all features.

More generally, ANAGDA provides the fusion agent for all navigation and sensor data in the vehicle, providing the optimal estimate of not only vehicle position, velocity, and attitude, but also accelerometer and gyro error parameters, GPS ionospheric and clock biases, sensor boresight (alignment) errors, and geo-location of an arbitrary number of fixed targets (also referred to herein as "features"). The architecture of ANAGDA is independent of specific sensor types and data rates, and hence is easily adaptable to the addition of new sensors, changing data rates, and loss or interruption of data from any given sensor.

The architecture of the ANAGDA system 100 consists of user/application-configurable functionalities in hierarchical layers. A sensing layer 110 senses the environment and contains the required databases for reference—such as Digital Terrain Elevation Data (DTED). The sensing layer 110 may include any of a wide variety of sensors. For examples, for dismounted soldiers operating or lost in enemy territories, the type of sensing may include camera, hand-held GPS, compass, radio, acoustic sensor, laser range finder, databases of key landmarks, and cellular telephones (possibly themselves including camera, data base access, and GPS or cell-tower or beacon triangulation capability). For land and airborne applications, the type of sensing may include GPS, IMU, acoustic sensors, radio bearing. Electro-Optical/Infrared (EO/IR), lidar and flash lidar sensors, radar including Doppler, synthetic aperture radar (SAR), and Real-beam, airspeed sensors, barometric altimeter, radar and lidar altimeters, and celestial sensors (star tracker).

A processing layer 120 includes a smart sensor resource manager, which is a performance-based sensor/feature selection module. That is, the processing layer 120 determines which sensors are available and providing usable data, and performs calculations on the raw sensor data.

Calculations in the processing layer 120 may include, for example; velocity estimation using optical flow from images, structure from motion calculations using image data, feature detection from radar or images, geo-registration of images with indexed map data, signal processing from navigation systems such as star tracker, etc.

A measurement abstraction layer 130 isolates the final fusion calculations from the processed sensor signals. The measurement abstraction layer 130 allows the fusion calculations to be performed independent of the number and types of sensors available. In other words, the measurement abstraction layer 130 takes the processed sensor data from the processing layer 130 as input, and provides as output a finite set of specific types of measurements. The outputs from the measurement abstraction layer 130 may include, for example, altitudes from both a barometric altimeter and a radar altimeter, headings from both a compass and star tracker, velocities from both an airspeed sensor and image optical flow calculations, position data from triangulation calculations on terrain features, etc.

A fusion layer 140 performs fusion of all available sensor measurements with the Inertial Measurement Unit (IMU) data. A measurement queue 150 contains measurements from the measurement abstraction layer 130, as discussed above. An onboard IMU 160 provides accelerations and angular rotation rate of the vehicle, as would be understood by one skilled in the art. The accelerations are combined with a gravity model 162 at a summing junction 164. The gravity model determines forces on the vehicle as a function of the distance from the vehicle to Earth's center, the mass of the vehicle, the mass of Earth and a gravitational constant. The acceleration data from the summing junction 164 and the angular rate data from the IMU 160 are provided to navigation equations of motion model 170, which computes vehicle positions and velocities.

At fusion module 180, the vehicle position, velocity and acceleration data from the navigation equations of motion model 170 are fused with the measurement data from the queue 150. The fusion module 180 may employ a Kalman Filter (KF), an Unscented Kalman Filter (UKF), a Square Root Filter (SRF), or any other mathematical technique suitable to the task. The output of the fusion module 180 is the vehicle navigation state at box 190—including vehicle position, velocity and attitude, and error estimates from the Kalman (or other) state vector. The error estimates include IMU errors, GPS errors (if used), target position errors, sensor errors of all sorts—including sensor alignment angle and calibration, and gravity model errors.

The navigation state at the box 190 is used for guidance and control of the vehicle—including corrections to course, pitch and speed made via throttle and control surface adjustments. Feedback of the navigation state is provided on line 192 to the processing layer 120, where the navigation state (the most accurate attitude and position, including altitude) aids in feature tracking calculations.

It is to be understood that the software applications and modules described above are executed on one or more computing devices having a processor and a memory module. The ANAGDA computing device is understood to receive input signals from the sensors in the sensing layer 120, and to perform computations therefrom as discussed above. Furthermore, various systems which are part of the vehicle/aircraft/weapon may read the navigation state data from the box 190, and perform calculations and take actions based on the navigation state data (such as an autopilot reacting to an altitude signal). Additionally, the navigation state data may be displayed for a person to view—such as on a cockpit display device in an aircraft, or on a display of a handheld device used by a soldier.

As can be appreciated from the preceding architecture discussion, the ANAGDA system 100 provides robust and seamless navigation solutions for GPS and non-GPS environments. ANAGDA offers significant advantages over previous systems, as it is a modular software solution which can be easily integrated on handheld devices for dismounts and existing and future ground and airborne platforms, and it combines in real-time various sources of information as they become available (is adaptive to what is available from a single or multiple platforms).

Other advantages of the ANAGDA architecture, which will become apparent from the following discussion, include: navigation and homing precision that is at least as good as GPS navigation and homing; realization of this approach in a small size, weight, power, and cost (SWaP-C) package; operations over GPS and GPS-denied areas; operations with passive sensors to avoid revealing the location of the mission platform(s) thereby reducing exposure of the mission platform(s) to the threat of attack; very short initialization latency (10-20 seconds); integration of a set of automated tools for pre-mission planning and short reaction time; self-monitoring capability, thus requiring no human intervention for analysis and adjustment; and minimization of the volume of data communicated among collaborative platforms and with their command-and-control nodes.

The ANAGDA GPS-denied navigation filter supports a wide range of applications such as autonomous ship-based landing, long range strike weapons, and prosecution of deeply buried and hardened targets and time sensitive targets. ANAGDA also supports applications encompassing airborne surveillance and attack missions using a single or multiple cooperating platforms, navigation of ground vehicles, and vectoring and rescue operations of dismounted soldiers in enemy territories in non-GPS environment. ANAGDA performs both relative navigation and absolute navigation, in contrast to the two-filter approach used elsewhere in the industry. The advantage of the ANAGDA single-filter implementation is higher computational efficiency, resulting in reduced run-time memory and processing requirements on low power processors for low cost delivery vehicles.

Several specific applications are discussed below, including different combinations of available sensors, fusion of the sensor data with IMU data, and usage of the resulting navigation information to accomplish the mission. These examples should provide a better appreciation of he flexibility and capability of the ANAGDA system 100.

Figure 3:
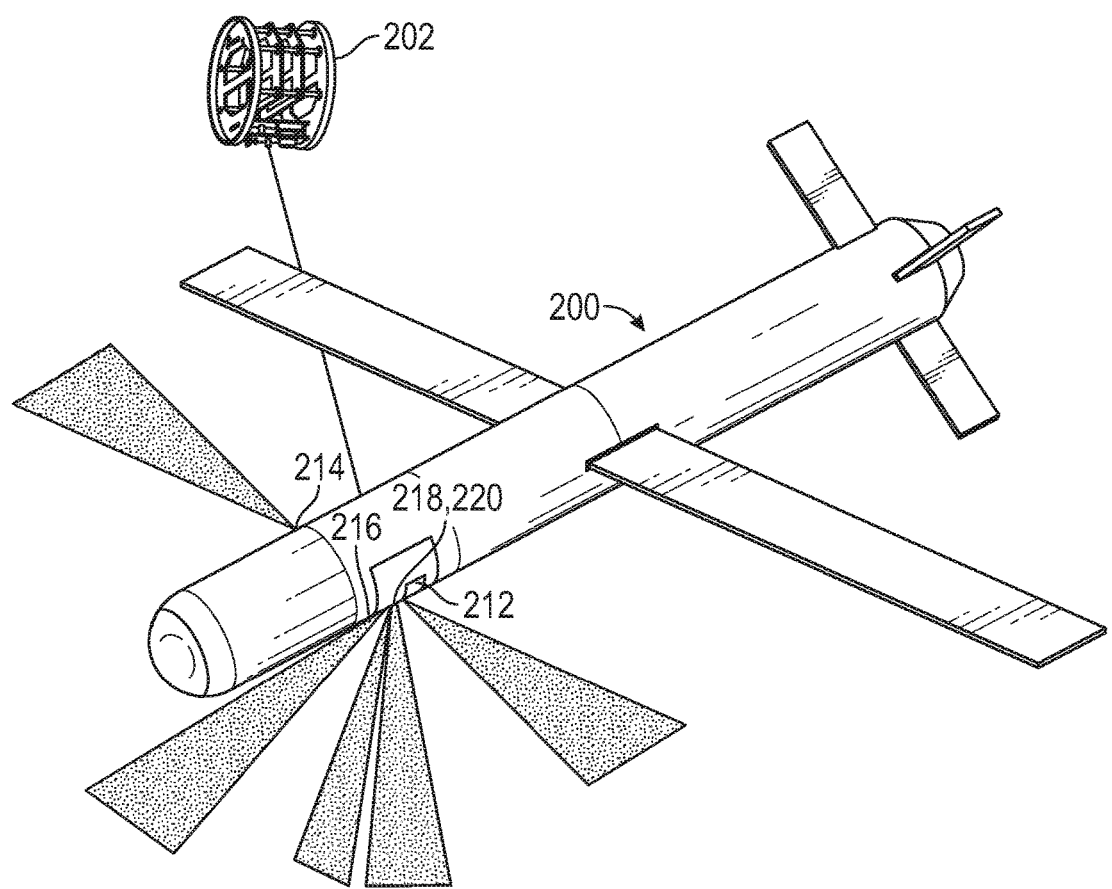
FIG. 3 is an illustration of an aerial vehicle equipped with multiple cameras and an inertial measurement unit (IMU), where the data from the cameras and the IMU can be fused to improve navigation.

FIG. 3 is an illustration of an aerial vehicle 200 equipped with multiple cameras and an inertial measurement unit (IMU), where the data from the cameras and the IMU can be fused by the ANAGDA system 100 to improve navigation. For the purposes of this discussion, consider the vehicle 200 to be an unmanned aerial vehicle (UAV) 200. Further consider the UAV 200 to be on a reconnaissance mission, either solo or in a swarm or formation of other UAVs.

The UAV 200 is equipped with an IMU 202, which may be a low-cost micro-electro-mechanical systems (MEMS)-based IMU. The UAV 200 is further equipped with a plurality of visible-light cameras—including a left-facing camera 212, a right-facing camera 214, a forward-facing camera 216 and a downward-facing camera 218—each having a field of view as shown. The UAV 200 is also equipped with a downward-facing infrared camera 220.

It is readily apparent that a reconnaissance vehicle such as the UAV 200 needs the cameras 212-220 in order to perform the reconnaissance mission. However, the cameras 212-220 can also serve another important purpose; using the ANAGDA system 100, images from the cameras 212-220 can be used to dramatically improve navigation accuracy as compared to IMU-only navigation.

Figure 4:
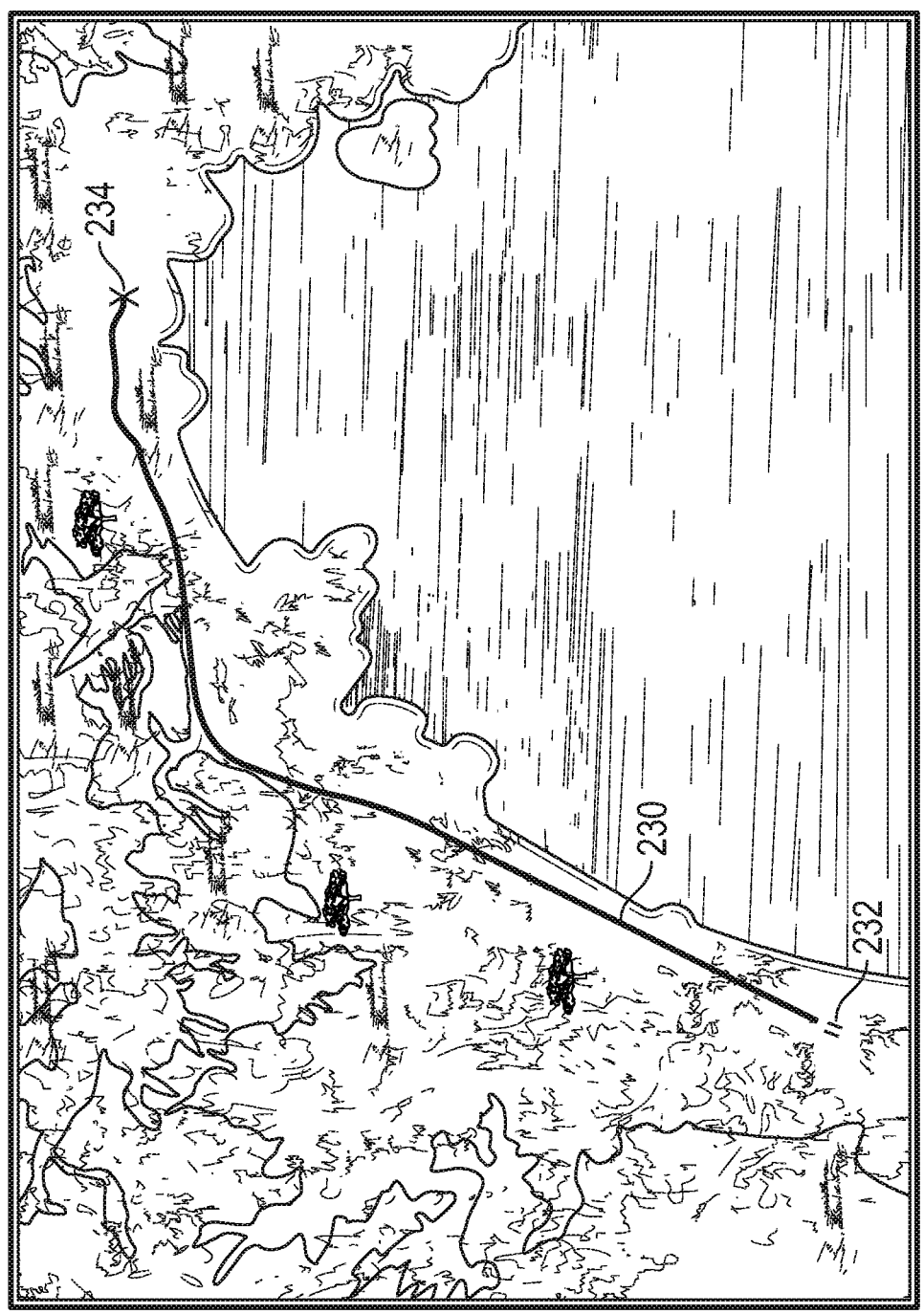
FIG. 4 is an illustration of an aerial route that may be taken by the vehicle of FIG. 3.

FIG. 4 is an illustration of an aerial route 230 that may be taken by the UAV 200 of FIG. 3. The route 230 takes the UAV 200 over land from a launch point 232 to a destination 234. In this scenario, several image-processing techniques may be employed to add increasing levels of accuracy to the navigation of the UAV 200.

A first technique involves a calculation of optical flow, which can be used to determine a velocity of the UAV 200. Optical flow is defined as the apparent motion of brightness patterns. Optical flow is characterized by a 2-D field of 2-D velocity vectors. The objective of motion estimation using optical flow is to find the 2-D velocity vector field given an image sequence f(x,y,t).

Figure 5B:
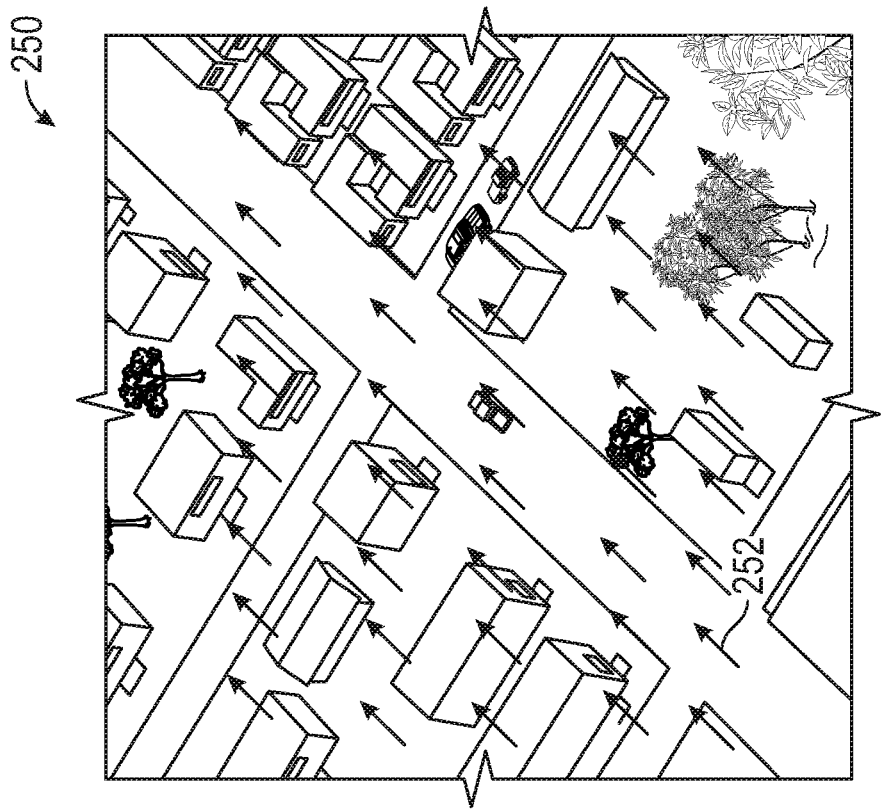
FIGS. 5A and 5B are images used in calculating a platform velocity using optical flow techniques.
Figure 5A:
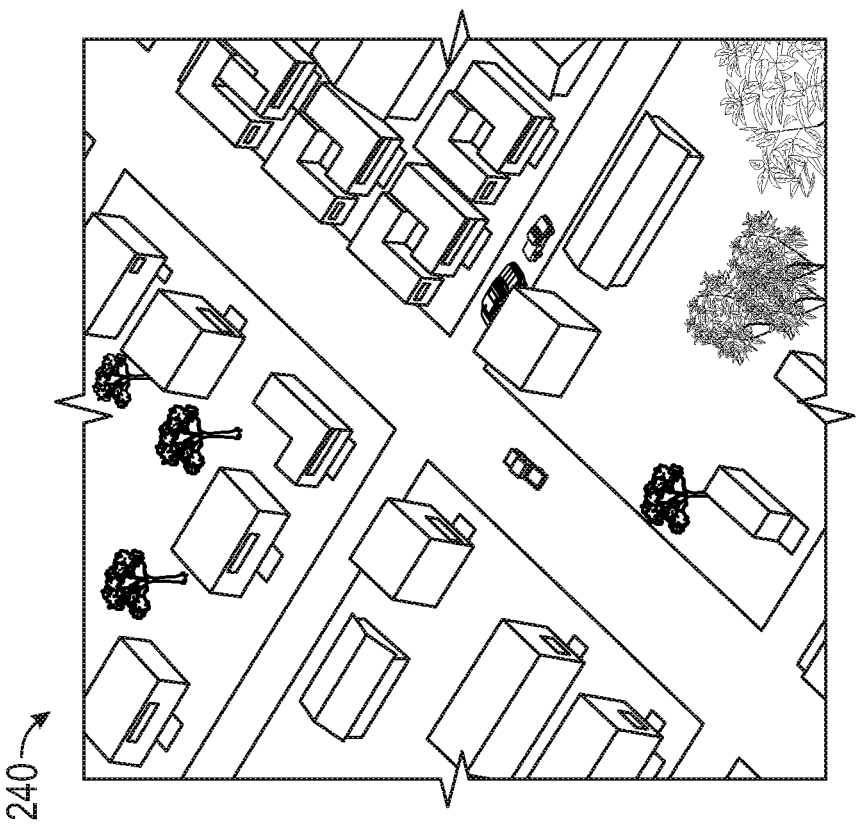

FIGS. 5A and 5B are images used in calculating a platform velocity using optical flow techniques. FIG. 5A shows an image 240 taken from one of the cameras, such as the downward-facing camera 218 at a particular time. FIG. 5B shows an image 250 taken from the downward-facing camera 218 at a subsequent time, where the elapsed time between the image 240 and the image 250 is known. Optical flow velocity (the rate of movement of pixels from one image to another) is a function of sensor platform velocity (UAV velocity) and height (above-ground altitude). The rate of pixel movement can be computed as; a distance 252 moved by features from the image 240 to the image 250, divided by the elapsed time. Thus, if UAV altitude can be determined from a source such as a barometric altimeter, then UAV velocity can be determined from an image sequence using optical flow.

Returning attention to the architecture diagram of the ANAGDA system 100 in FIG. 2, the cameras 212-220 provide their images in the sensing layer 110, the optical flow calculations are performed in a module in the processing layer 120, and the UAV velocity (from optical flow) is provided to the measurement queue 150 where it is fused with the data from the IMU 202. Even adding just the one independently-sensed parameter (UAV velocity) to the IMU data has been shown to significantly improve navigation accuracy.

Structure from Motion (SFM) is another technique which may be employed in the processing layer 120 to improve the accuracy of vehicle navigation and geo-location in the absence of GPS, SFM is a photogrammetric range imaging technique for estimating three-dimensional structures from two-dimensional image sequences that may be coupled with local motion signals. To find correspondence between images from the cameras 212-220, features such as corner points (edges with gradients in multiple directions) are tracked from one image to the next. The feature trajectories over time are then used to reconstruct their 3D positions and the camera's motion.

An SFM module in the processing layer 120 determines the 3-D locations of a larger set of features by combining 2-D image locations generated by the optical flow module with Digital Terrain Elevation Data (DTED) and 3-D vehicle position information obtained from the fusion layer 140 (via the feedback line 192). Once the 3-D feature coordinates are initialized and found to be stable, the SfM module passes a small set of measurements to the measurement queue 150, which uses them in the fusion calculations to further refine the navigation state of the UAV 200.

Figure 6A:
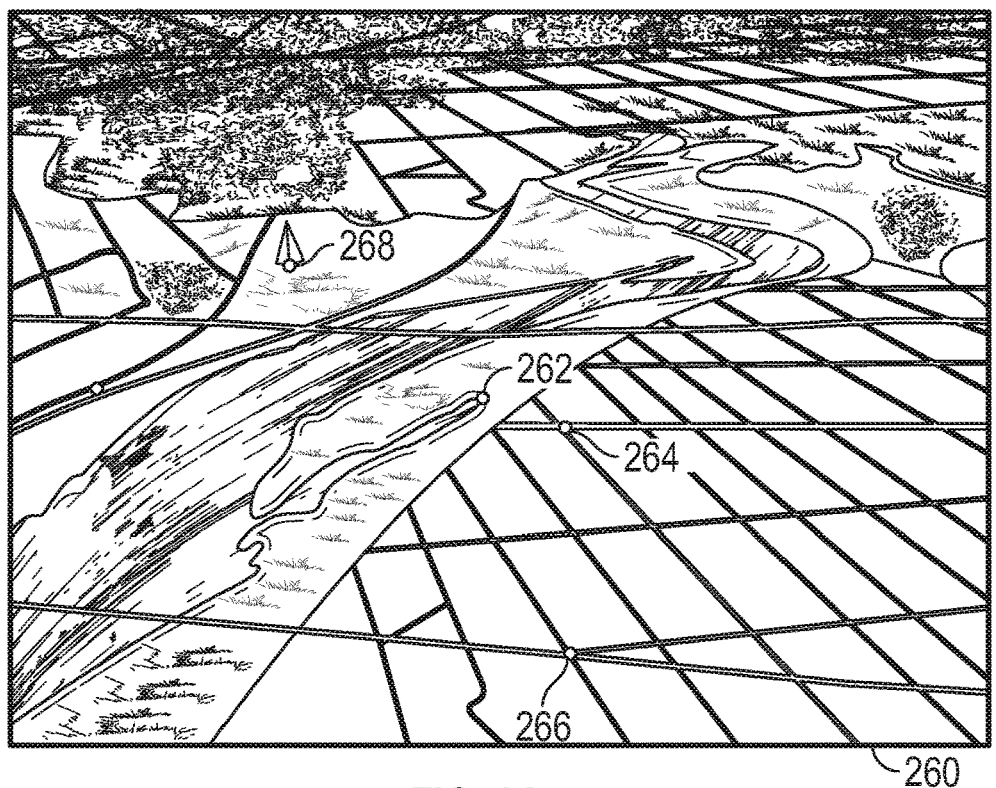
FIGS. 6A and 6B are illustrations of images taken by the vehicle of FIG. 3 during portions of the route of FIG. 4, including ground features which may be tracked to correlate the position of the vehicle.
Figure 6B:
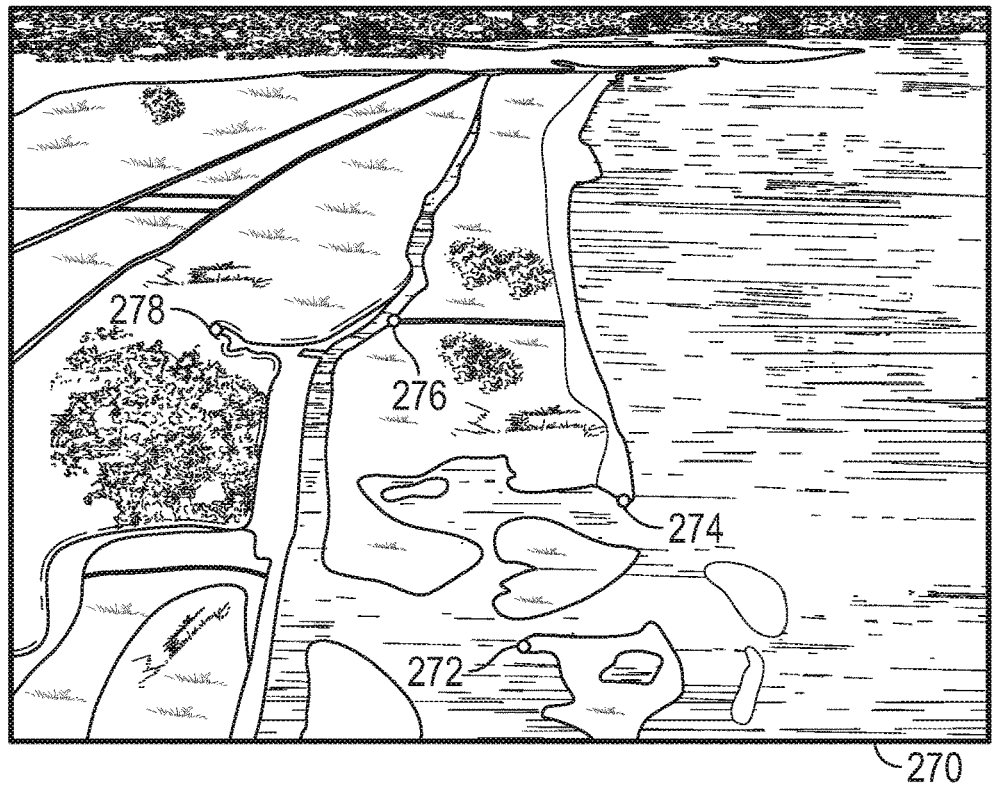

FIGS. 6A and 6B are illustrations of images taken by the cameras 212-220 on the UAV 200 along portions of the route 230 of FIG. 4, including ground features which may be tracked to correlate the position of the UAV 200. In image 260 of FIG. 6A, feature points 262, 264, 266 and 268 are identified. Feature detection and tracking techniques can be employed using the feature points 262-268. Feature detection and tracking involves computing abstractions of image information and making local decisions at every image point whether there is an image feature of a given type at that point or not. Once features are identified in an image, they can be tracked in subsequent images, and information about the movement of the host platform can be determined.

On a multi-camera platform such as the UAV 200, some land features may be in the field of view of more than one camera at the same time. In addition, multiple cameras provide multiple images for use in tracking features, thereby increasing the fidelity of the data in the calculation. Using feature detection and tracking calculations on the images from the cameras 212-220, information such as velocity, roll/pitch/yaw angles and altitude of the UAV 200 can be determined in the processing layer 120 and provided to the measurement queue 150 for use in navigation state calculations in the fusion module 180.

At another portion of the route 230 shown in image 270 of FIG. 6B, feature points 272, 274, 276 and 278 are identified. Because the mission of the UAV 200 was pre-planned to follow the route 230, the location of the UAV 200 at any point in time is generally known. If the underlying territory of the route 230 is well defined—in databases such as DTED, and with digital maps, landmark data and indexed reference images—then geo-registration techniques can be employed using the feature points 272-278. Geo-registration is the process of adjusting a target image (from the cameras 212-220) to the geographic location of a "known good" reference image in order to determine the location of the target image and hence the imaging platform. When applied over time to image sequences, geo-registration can provide very good position, velocity and course information to the measurement queue 150 for use in the fusion module 180. This type of image-based sensing, particularly from a multi-camera platform like the UAV 200, has been shown to dramatically improve navigation accuracy. For example, in one study, navigation error over a 10-minute mission was reduced by about ⅔ when switching from a single-camera system to a four-camera system fused with IMU data.

The preceding discussion related to FIGS. 3-6 involved the UAV 200 and its particular onboard sensor set. However, it should be understood that the UAV 200 with just the IMU 202 and the cameras 212-220 is merely exemplary in illustrating how image processing techniques may provide measurement data which is usable in the ANAGDA system 100 to compute a refined navigation state in a fusion calculation. Clearly, camera image data may also be used in the ANAGDA system 100 on manned aircraft, on aerial weapons, and even on ground vehicles and by personnel on foot. Furthermore, camera image data is also useful in navigation state fusion calculations along with data from other sensors such as radar.

Figure 7:
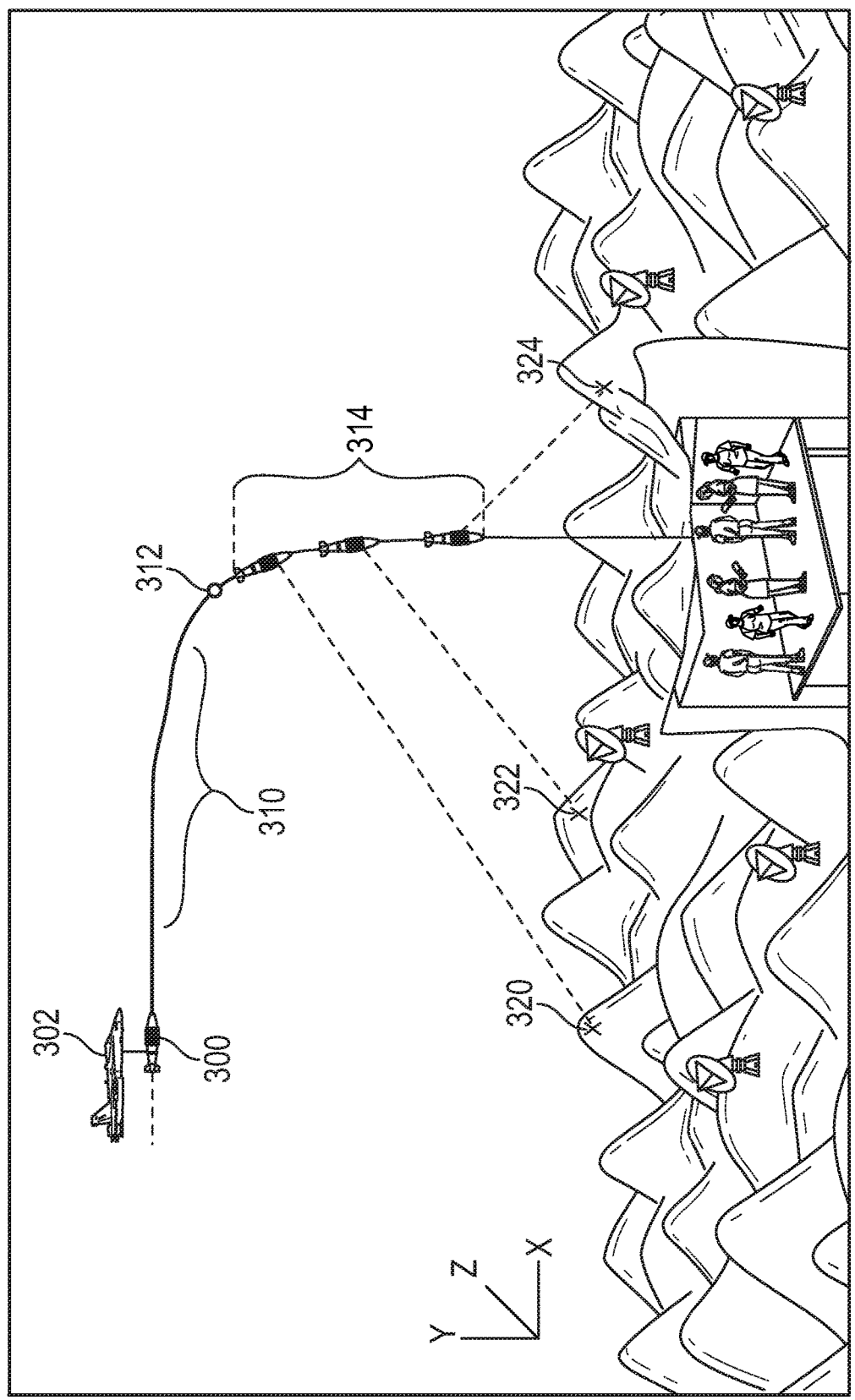
FIG. 7 is an illustration of the deployment of a weapon from an aircraft, where the weapon has an onboard IMU and radar system, and data from the IMU and the radar are fused for navigation.

FIG. 7 is an illustration of the deployment of a weapon 300 from an aircraft 302, where the weapon 300 has an onboard IMU and radar system, and data from the IMU and the radar are fused for navigation. In this scenario, the weapon 300 has a booster for increasing its speed before impact, and flight controls for adjusting the pitch and heading angles to achieve the desired impact point and near-zero Angle of Attack (AoA). After the weapon 300 is dropped or released from the aircraft 302, the weapon 300 undergoes a freefall phase 310 during which the flight controls are used to adjust pitch and heading to maintain the desired flight path. During the freefall phase 310, IMU data only may be used for navigation, as the duration of the freefall phase 310 is short enough that IMU error may not accumulate to an undesirable level.

At a terminal pitch over point 312, the weapon 300 transitions to a near vertical path and begins a boost phase 314. In the boost phase 314, a booster is activated to accelerate the weapon 300, and flight controls are used to achieve the desired impact point and AoA. During the boost phase 314, and possibly the latter portion of the freefall phase 310, the radar system will be needed for refined navigation. As discussed above, the ANAGDA system 100 can seamlessly adapt from IMU-only navigation operation to a mode where radar data is available to augment the IMU data. In this case, predefined "look-at-points" or reference points 320, 322 and 324 are identified by the radar system. The reference points 320-324 are land-based features whose radar-identifiable signatures and locations on land are known. Using recursive triangulation calculations relative to the reference points 320-324, the position (including altitude and attitude) and velocity of the weapon 300 can be determined in the processing layer 120 and provided to the measurement queue 150 for use in navigation state calculations in the fusion module 180.

If the weapon 300 of FIG. 7 also includes a forward-looking camera, another form of optical flow calculation can be used to refine navigation accuracy. In this case, optical flow is used to calculate a point known as the Focus of Expansion (FoE). The FoE is the point that has zero optical flow velocity; that is, the point where the optical flow field velocity vectors converge. FoE calculations can provide estimations of the impact point of the weapon, and the angle of attack at impact, both of which are critical information in weapon delivery and can be used in addition to the IMU and radar data discussed above.

Another example of a weapon deployment is similar to the weapon 10 of FIG. 1 when launched from land or sea. In this case, the weapon 10 (which has a propulsion system suitable for sustained flight) climbs to a cruise altitude and sustains high-speed, high-altitude cruise for some time. During high-altitude cruise, radar measurements of land features may be unavailable, inaccurate or undesirable (if the weapon 10 wants to avoid transmitting during this part of flight). High altitude flight, particularly at night, is an ideal situation for usage of a celestial sensor (star tracker) for additional navigation input in the ANAGDA system 10. During the cruise phase, the celestial sensor can provide crucial data—particularly heading data—which can be fused with the IMU data to refine the navigation state of the weapon 10. The independently measured heading data dramatically reduces cumulative navigation error relative to IMU-only navigation.

When the weapon 10 nears its target and transitions from high-altitude cruise to terminal dive, the celestial sensor will be unable to provide useful measurements. At this point, a radar sensor can be switched on to provide the precise aiming needed to accomplish the mission. As discussed with respect to the architecture diagram of FIG. 2, the ANAGDA system 100 is perfectly suited to the above mission scenario. During high-altitude cruise, the radar sensor is off, and the processing layer 120 provides only heading data from the celestial sensor to the measurement queue 150 for use with IMU data in navigation state calculations in the fusion module 180. Later, during terminal dive, the celestial sensor is off or not useful, the radar sensor is on, and the radar-based feature tracking calculations are fused with IMU data in the fusion module 180 for precise navigation of the weapon to the target. The ability to handle the addition and deletion of sensor measurements in this manner, seamlessly providing fused navigation state information, is a key feature of ANAGDA.

The benefits of the sensor-combination approach discussed above are significant. In accuracy studies comparing weapon aiming accuracy defined as 50% Circular Error Probably (50% CEP), an IMU-only navigation demonstrated a divergence from intended target which continued to worsen over the (approximately 30 minute) flight time, and resulted in a 50% CEP of 1000-2000 meters (m). Addition of celestial sensor data in the ANAGDA system improved the performance by about an order of magnitude, with a resulting 50% CEP of 150-300 m. Further addition of radar data during terminal dive improved accuracy by about another order of magnitude, with a resulting 50% CEP of about 15 m.

As mentioned repeatedly above, IMU-only navigation is susceptible to cumulative error over the duration of a mission. The amount of error is determined in large part by the quality of the IMU. A navigation-grade IMU is one in which the error is specified at a small fraction of a degree per hour. Navigation-grade IMUs include high-quality mechanical gyroscopes, and would typically be found on military and commercial aircraft. A tactical-grade IMU is one in which the error may be several degrees per hour. Tactical-grade IMUs also include mechanical gyros, but not of the quality of navigation-grade. MEMS-based IMUs have also been developed which do not have gyroscopes, and are very inexpensive in comparison to gyro-based IMUs. The ANAGDA system allows designers to include less-expensive IMUs in expendable platforms such as weapons, because the fusion of sensor-based measurements with IMU data prevents the accumulation of large errors in navigation state.

It is also noteworthy that weapon missions such as the one described above often cannot take advantage of the accuracy of radar navigation during the entire flight. This is because radar measurements may be unavailable or inaccurate during high-altitude cruise, and also because it may be desirable to use only passive sensing for the majority of the flight. Thus, it is the combination of IMU data, celestial sensor data and (late in the flight) radar data—adaptively fused by the ANAGDA system 100—which enables the successful mission completion of the weapon 10.

Another navigation application involves dismounted soldiers—that is, paratroopers, special-ops forces, infantry, sailors, marines, etc. when operating on foot or otherwise dismounted from any vehicle, ship or aircraft. In the dismount application, even though the types of sensor readings may be different than in other applications, the ANAGDA system 100 can still be used for navigation. In the most favorable conditions, a dismount may have a GPS receiver providing reliable navigation information. However, in a GPS-denied environment, a dismount may have to employ other forms of navigational measurement. One such measurement may be a compass direction vector toward a geographic feature (or preferably more than one) such as a known mountain peak. Celestial measurements may be made at night. A barometer may provide an indication of altitude. Taken together, these measurements can be used by the ANAGDA system 100 to calculate a navigation state—which, in the case of a dismount, is primarily concerned with position.

The navigation applications discussed above have all been absolute in nature. That is, the aircraft or weapon is being navigated to a fixed location generally defined as a point on Earth. For these types of surveillance and strike missions, high accuracy absolute navigation is required to strike at a mission planned targets with known geodetic location, even in degraded conditions including low cloud ceiling, rain, and GPS-denial. However, as mentioned at the outset, relative navigation is also important in some military applications. The following discussion addresses the challenges of relative navigation.

Autonomous landing of fixed and rotary wing aircraft on naval carriers and small deck surface ships requires high precision relative navigation schemes that are robust to at-sea degraded conditions including fog, rain, high sea state, and GPS-denial. Most GPS/GPS-denied navigation filters are designed to provide either absolute or relative navigation state, but not both. However, the ANAGDA system 100 includes a single Robust Adaptive Filter (RAF) that handles both absolute and relative navigation. The RAF key design feature is to provide absolute and relative navigation in GPS and GPS-denied environment which can be used in a wide range of applications. The filter software is the same for both absolute and relative navigation. Switching the application from absolute to relative navigation is performed via a set of input parameters. The ability of the RAF design in the ANAGDA system 100 to switch on the fly between absolute and relative navigation, to support missions at sea and on-shore and target time sensitive targets, is a key advantageous feature.

Figure 8A:
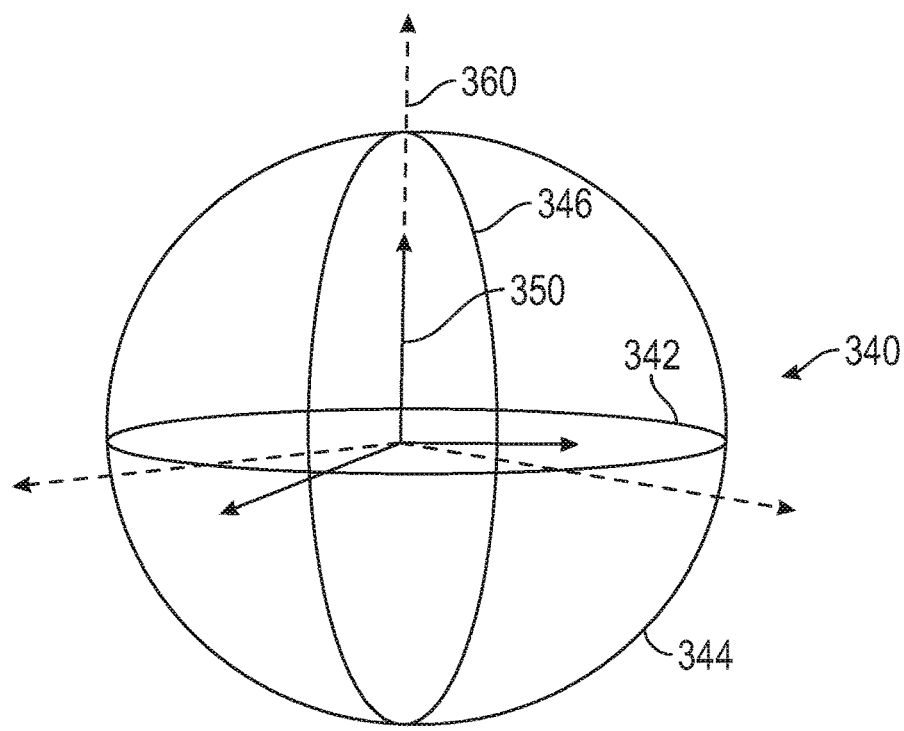
FIGS. 8A and 8B are diagrams of the Earth and several coordinate systems used to illustrate the concepts of absolute and relative navigation.
Figure 8B:
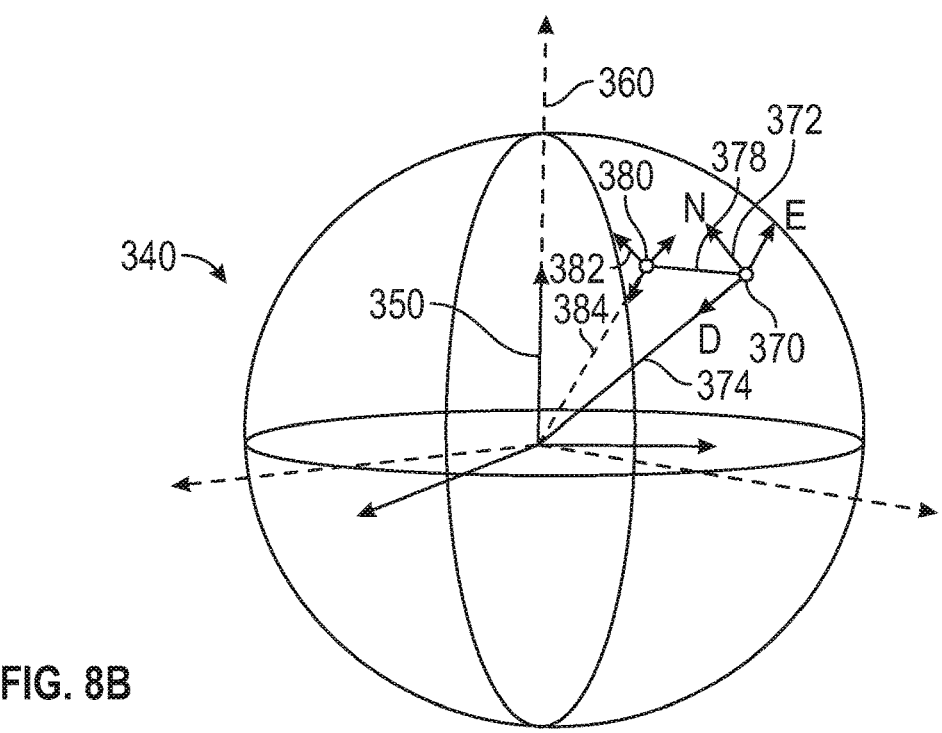

FIGS. 8A and 8B are diagrams of the Earth and several coordinate systems used to illustrate the concepts of absolute and relative navigation. FIG. 8A shows the Earth 340 represented by an equatorial plane 342 and two meridian planes 344 and 346. An Earth-Centered Earth-Fixed (ECEF) coordinate system 350 has its origin at the center of the Earth, X and Y axes in the equatorial plane 342, and Z axis through the North Pole. The ECEF coordinate system 350 is fixed to the Earth and rotates with it. An Inertial-Fixed (IF) coordinate system 360 also has its origin at the center of the Earth, X and Y axes in the equatorial plane 342, and Z axis through the North Pole. However, the IF coordinate system 360 has a fixed orientation in space and does not rotate with the Earth.

FIG. 8B also shows the Earth 340, the ECEF coordinate system 350 and the IF coordinate system 360. In addition, FIG. 8B includes an aircraft 370 with an NED coordinate system 372. The NED coordinate system 372 has an origin at a point (such as the center of gravity) on the aircraft 370, an X axis pointing due North and a Y axis point due East (both in a plane which is tangent to an Earth sphere), and a Z axis pointing Down toward the center of the Earth. The aircraft 370 is located at a position vector 374 ($r_a$), which may preferably be defined in the IF coordinate system 360. A ship 380 similarly has an affixed NED coordinate system 382, where the ship 380 is located at a position vector 384 ($r_s$).

As implied by the name, relative navigation involves two different bodies which may both be moving. In this case, the two bodies are the aircraft 370 and the ship 380. A relative position vector 378 ($r_{rel}$) is defined as the vector from the aircraft 370 to the ship 380. The adaptive filter for relative navigation must process three types of measurements; absolute measurements of the position/orientation/velocity of the aircraft 370 (such as IMU data, GPS data, etc.), absolute measurements of the position/orientation/velocity of the ship 380 (such as IMU and GPS data), and relative measurements of the position/orientation/velocity of the ship 380 with respect to the aircraft 370 (discussed in the examples below).

Figure 9A:
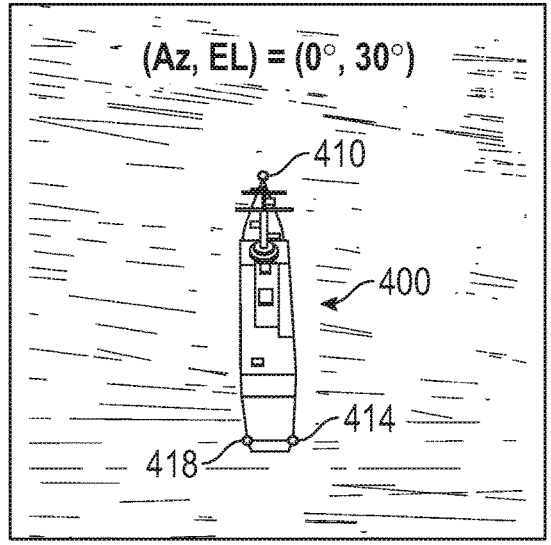
FIGS. 9A/B/C/D are illustrations of a ship at sea as viewed from an aircraft at a variety of azimuth and elevation angles.
Figure 9B:
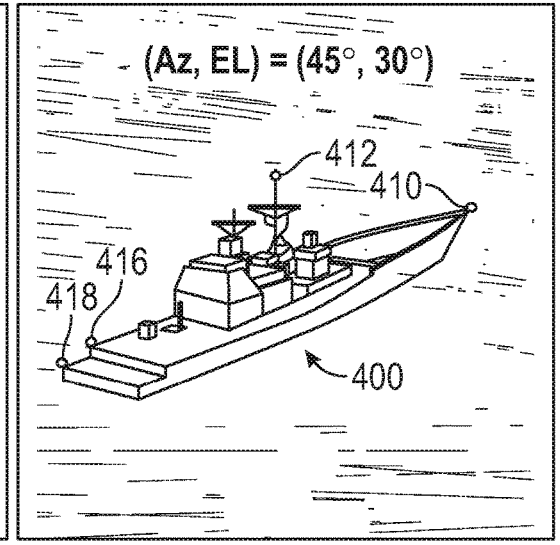
Figure 9C:
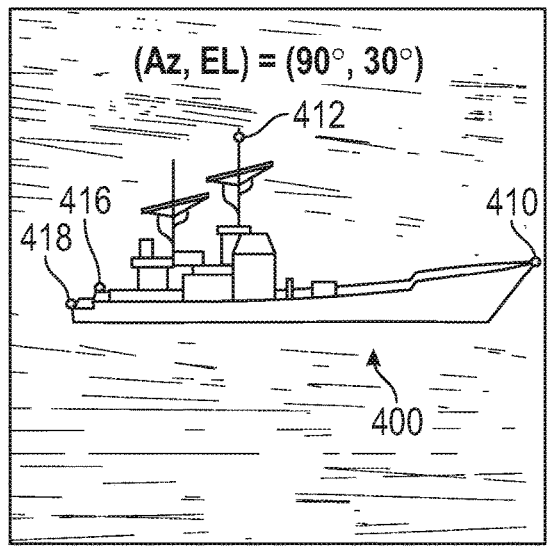
Figure 9D:
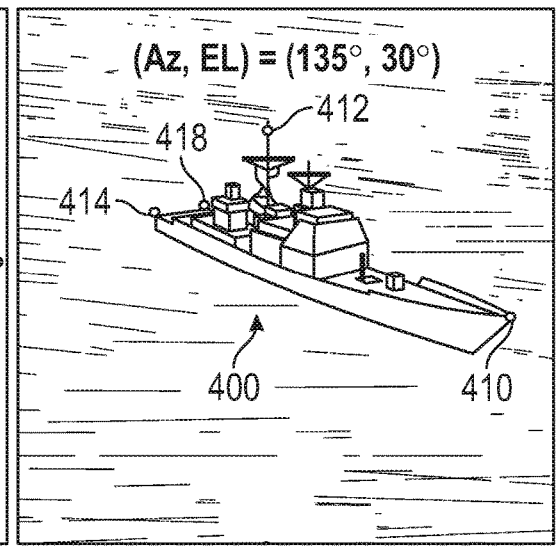

FIGS. 9A/B/C/D are illustrations of a ship 400 at sea as viewed from an aircraft (not shown), where the ship 400 appears at a variety of azimuth and elevation angles relative to the aircraft. In this case, where the ship 400 is not an aircraft carrier, the aircraft may be a UAV or a helicopter. In FIG. 9A, the ship 400 has a relative azimuth angle of 0° and an elevation angle of 30°. In FIG. 9B, the ship 400 has a relative azimuth angle of 45° and an elevation angle of 30°. In FIG. 9O, the ship 400 has a relative azimuth angle of 90° and an elevation angle of 30°. In FIG. 9D, the ship 400 has a relative azimuth angle of 135° and an elevation angle of 30°.

It can also be seen in FIGS. 9A/B/C/D that, depending on the orientation of the ship 400 relative to the aircraft, different combinations of features on the ship 400 may be detectable. For example, in all four figures, a feature point 410 (ship deck bow) is visible. In FIGS. 9B/0/D, a feature point 412 (mast top) is visible, but in FIG. 9A it is not. Similarly, feature points 414-418 are visible in some views but not in others. In shipboard landing applications, the aircraft will have a variety of sensors (radar, lidar, cameras) for detecting feature points on the ship 400.

In relative navigation scenarios such as the shipboard landing application of FIG. 9, the aircraft knows what type of vessel it is landing on; therefore it has available templates of model-based feature points to look for on the ship 400, and the 3-D position of each feature point on the ship 400. As discussed previously with respect to the reference points 320-324 of FIG. 7, using sensor readings of multiple feature points, the aircraft can compute position, orientation and velocity information of the aircraft relative to the ship 400. This relative measurement data can be included, along with absolute measurements of aircraft and ship state, in a fusion calculation which yields navigation state for both the aircraft and the ship 400 in absolute terms and their relative navigation state with respect to each other.

In addition, the ship 400 will also have sensors onboard (such as radar) capable of sensing the position/orientation/velocity of the aircraft with respect to the ship 400. This additional source of relative measurement data can be included in the relative navigation fusion calculation.

Figure 10A:
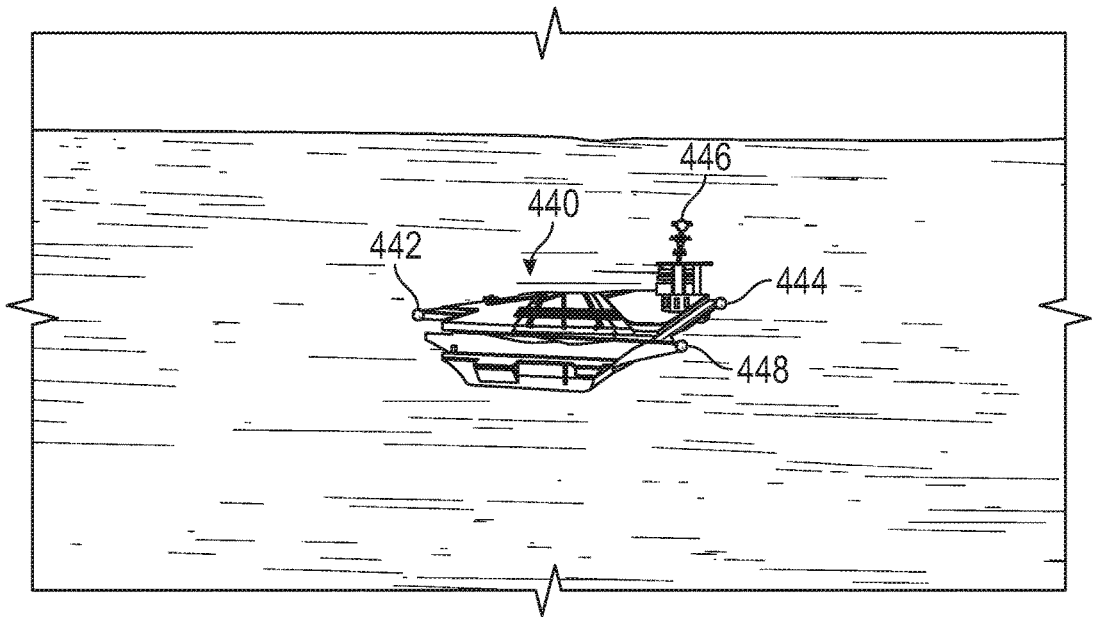
FIGS. 10A and 10B are illustrations of an aircraft carrier as viewed from an aircraft in the process of an approach and shipboard landing.
Figure 10B:
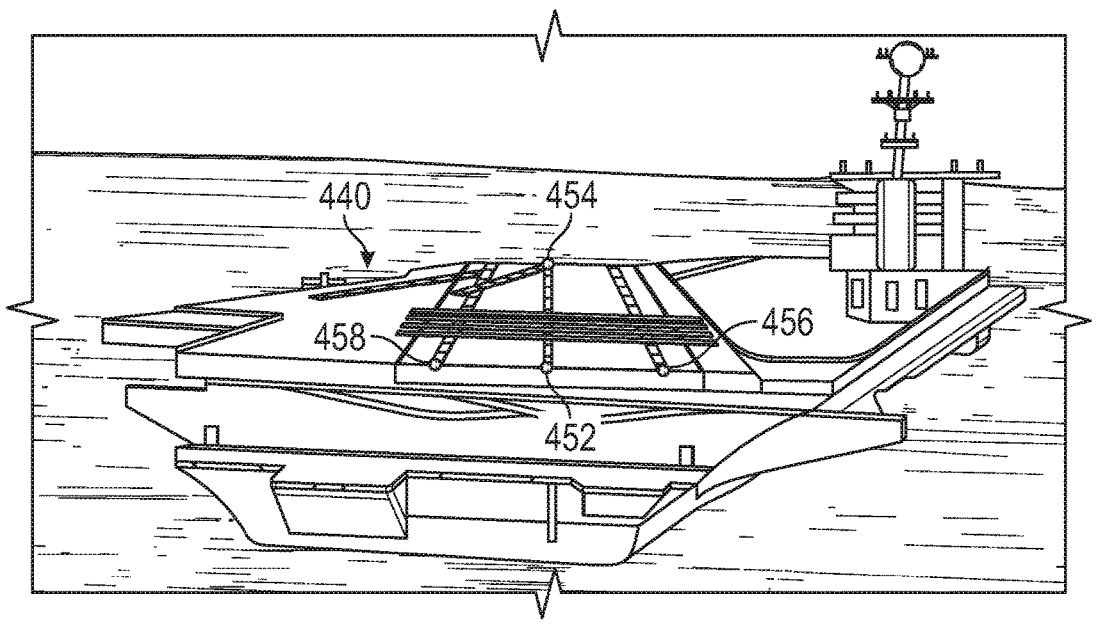

FIGS. 10A and 10B are illustrations of a ship 440 as viewed from an aircraft (not shown) in the process of an approach and shipboard landing. In this case, where the ship 440 is an aircraft carrier, the aircraft may be a fighter jet or a manned reconnaissance plane. FIGS. 10A/B illustrate a different challenge in feature identification for relative navigation in shipboard landing applications. That challenge is that, although the relative orientation of the ship 440 with respect to the aircraft is not changing (as it was in FIGS. 9A-D), the set of detectable feature points will change as the aircraft approaches the ship 440.

FIG. 10A shows the ship 440 when the aircraft is on approach, still some distance from the ship 440. From this distance, a set of feature points 442-448 are detectable—with a radar system, or processing of visible camera images, or otherwise. In the approach scenario of FIG. 10A, the feature points 442-448 tend to be points on the extremities or outline of the ship 440. It is clearly understandable that the relative position of the feature points 442-448, even if they are all on the ship outline, will change based on the azimuth angle, elevation angle and distance of the aircraft with respect to the ship 440. Templates defining the 3-D location of feature points on the ship 440 are available to the relative navigation system onboard the aircraft, to aid in feature point identification.

FIG. 10B shows the ship 440 when the aircraft is in final preparation for landing on the ship 440. From this short distance, a set of feature points 452-458 are detectable—again, with a radar system, or processing of visible camera images, or otherwise. In the landing scenario of FIG. 10B, the feature points 452-458 tend to be markings (such as runway centerline and sideline intersection with a runway end line) on the deck of the ship 440. It is apparent that the relative position of the feature points 452-458, even if they are all on a common plane of the ship's deck, will change based on the azimuth angle, elevation angle and distance of the aircraft with respect to the ship 440. Templates defining the deck markings on the ship 440 are available to the relative navigation system onboard the aircraft, to aid in feature point identification.

Many different types of sensors are available in shipboard landing scenarios, and each type has its pros and cons in terms of signal quality in different weather conditions. For example, optical image processing produces very good data, but only in good visibility conditions. Infrared sensors can penetrate hazy conditions and operate at night, but only when a thermal contrast is present. Lidar and radar systems provide the most flexibility, being operable in severely degraded atmospheric conditions (fog, smoke, haze, rain), particularly radar systems which interact with a ship-based transponder. The wide array of sensor types and their applicability to different shipboard landing scenarios further illustrates a key benefit of the ANAGDA architecture—the ability to use any available sensor signals to refine navigation states, adaptively adding or removing sensor types on the fly during a mission.

Figure 11:
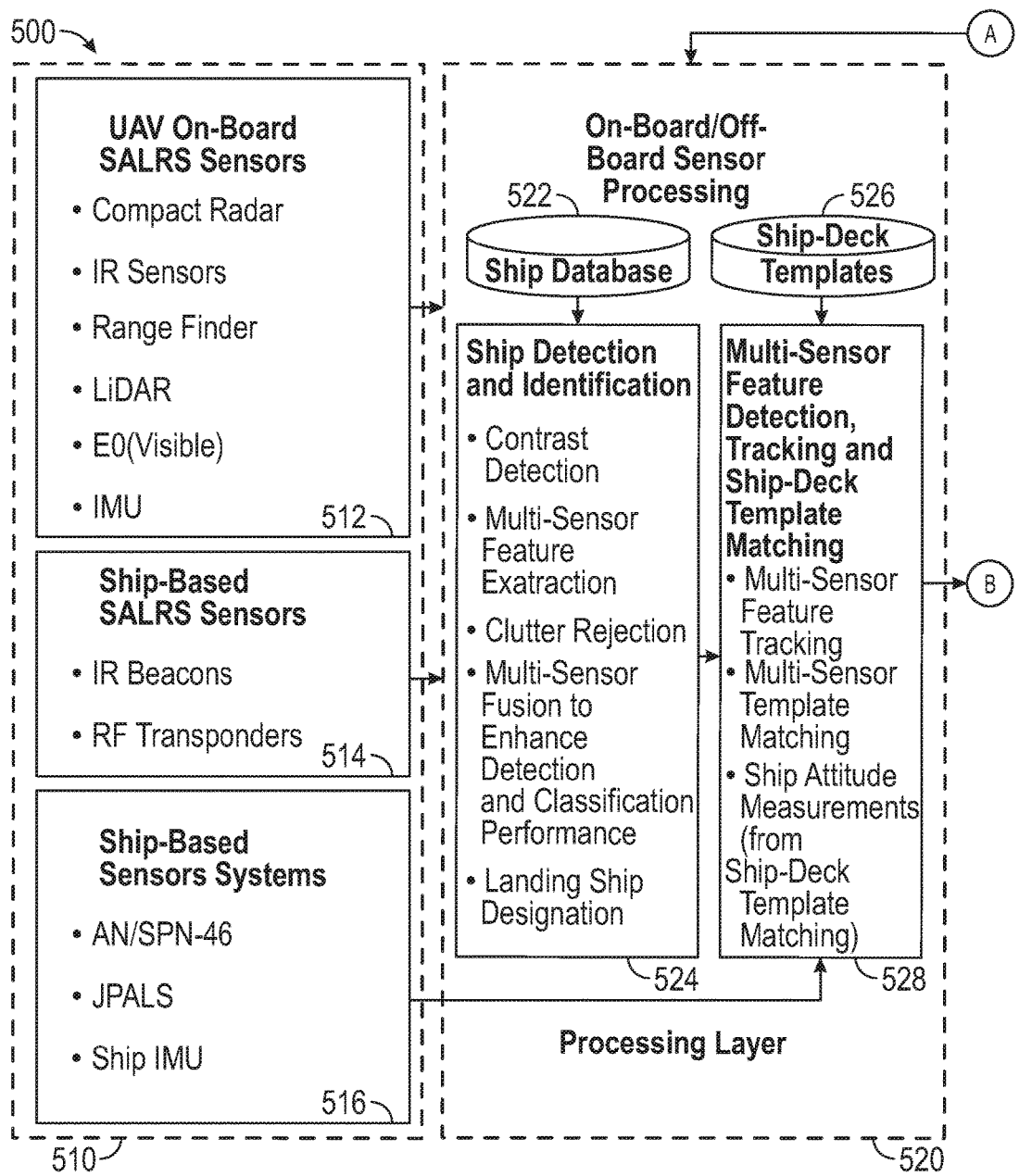
FIG. 11 is an architecture diagram of an adaptive navigation system configured for shipboard landing applications, according to an embodiment of the present invention.
Figure 11:
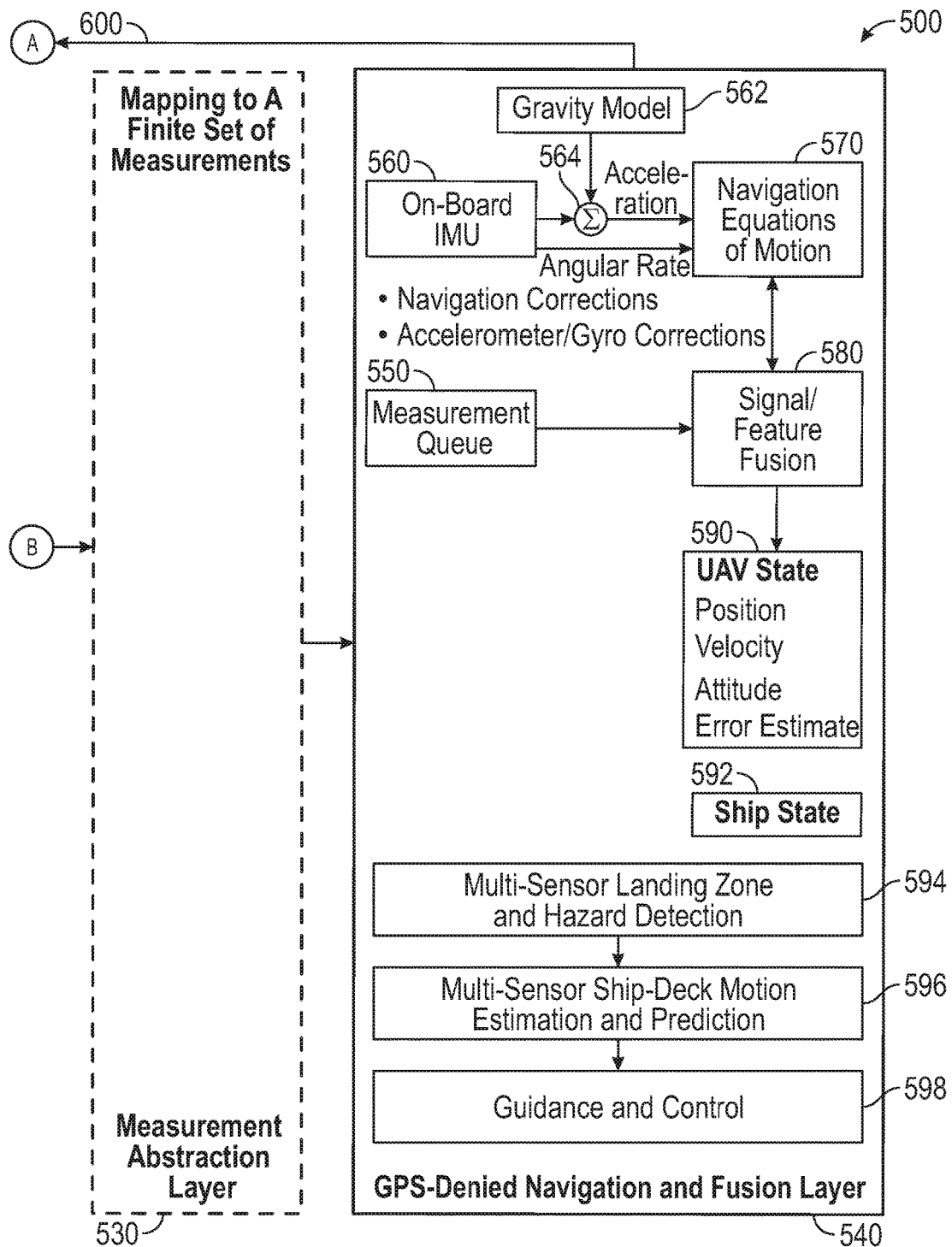

FIG. 11 is an architecture diagram of an adaptive navigation for airborne, ground and dismount applications (ANAGDA) system 500 configured for shipboard landing applications, according to an embodiment of the present invention. The ANAGDA system 500 includes a sensor layer 510—which in this case includes aircraft-based sensors 512, and ship-based sensors 514 and 516. The aircraft-based sensors 512 include both sensors for measuring the state of the aircraft itself (such as an IMU) and sensors (such as radar) for detecting the ship and its relative position/orientation. Likewise, the ship-based sensors 514/516 include both sensors for measuring the state of the ship itself (such as an IMU) and sensors (such as a transponder) for detecting the aircraft and its relative position/orientation.

A processing layer 520 includes a ship database 522 and a ship identification module 524, which together are used to identify a landing ship based on preliminary sensor measurements. A database 526 of ship deck templates and a module 528 for feature detection and template matching enable the processing layer 520 to track ship features, match deck templates and calculate relative ship attitude as viewed from the aircraft. The parameters calculated by the processing layer 520 pass through a measurement abstraction layer 530, which makes the ANAGDA system 500 agnostic to sensor types, as discussed previously.

A fusion layer 540 performs navigation fusion calculations, now including both aircraft navigation state and relative ship position. A measurement queue 550 receives measurements from the measurement abstraction layer 530, as discussed above. An onboard IMU 560 provides accelerations and angular rotation rate of the aircraft. The accelerations are combined with a gravity model 562 at a summing junction 564. The acceleration data from the summing junction 564 and the angular rate data from the IMU 560 are provided to a navigation equations of motion model 570, which computes aircraft positions and velocities.

At fusion module 580, the position, velocity and acceleration data from the navigation equations of motion model 570 are fused with the measurement data from the queue 550. The fusion module 580, which is the robust adaptive filtering routine discussed previously, may employ a Kalman Filter (KF), an Unscented Kalman Filter (UKF), a Square Root Filter (SRF), or any other mathematical technique suitable to the task. The output of the fusion module 580 is the navigation state info at boxes 590 and 592—including aircraft position, velocity and attitude, and error estimates from the Kalman (or other) state vector, and absolute and relative ship positions.

The aircraft and ship states from the boxes 590 and 592 are used for ship landing zone detection, ship-deck motion estimation and prediction, and ultimately guidance and control of the aircraft—including corrections to course, pitch and speed made via throttle and control surface adjustments. Feedback of the navigation states is provided on line 600 to the processing layer 520, where the navigation states (particularly relative attitude and position, including altitude) aid in feature tracking calculations.

The robust adaptive filter (RAF) in the fusion module 580 inherently performs the spatial and temporal fusion of all available sensory measurements including IMU data to produce the optimal navigation state vector. The RAF maximizes the synergy among all available sensor measurements such as radar, lidar, EO/IR, visible, and ship-based sensors such as beacons and RF transponder and any a priori information to provide robust, and seamless high precision and continuous navigation with or without GPS. The spatial and temporal fusion of multi-sensor measurements minimizes the effect of the degraded weather conditions.

In the RAF, quaternions are used to specify the attitude rather than direction cosines. Quaternions are an alternative to Euler angles or rotation matrices in describing three-dimensional rotations. This is the attitude parameterization of choice because 1) it is free of singularities, 2) the attitude matrix and kinematics do not involve highly nonlinear functions, such as transcendental functions involved with Euler angles, and 3) a closed-form solution for the propagation of the relative quaternion kinematics exists. The RAF fuses multi-sensor measurement data with aircraft IMU data to produce the aircraft's relative/absolute position and velocity, and corrections to the aircraft navigation state along with IMU error parameters.

The ANAGDA systems discussed above maximize the synergy among one-time inputs of measurements and sequential inputs from sensors to known or unknown targets or landmarks (including ground or heavenly bodies or satellites), using available databases (including landmark features/positions, and DTED) and autonomous sensing such as IMU or GPS to determine platform or user position. The ANAGDA filter software is decoupled from the type of sensing using measurement abstraction, thus is adaptive to numerous applications ranging from dismounted soldiers to aircraft/weapon navigation and shipboard landing. The ANAGDA systems reduce the vulnerability to GPS interruptions, providing robust navigation for both absolute and relative applications.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An adaptive navigation system on a mobile platform, said navigation system comprising:
   one or more sensors onboard the mobile platform, said sensors providing sensor signals;
   an inertial measurement unit (IMU) onboard the mobile platform, said IMU providing translational acceleration and angular rotational rate data about the mobile platform; and
   a computer onboard the mobile platform having a processor, memory and storage, said computer being configured with;
   a sensing layer in communication with the one or more sensors and receiving the sensor signals;
   a processing layer in communication with the sensing layer and including software modules for determining what type of sensor signals are available, and processing the sensor signals to produce measurement data usable for navigation calculations;
   a measurement abstraction layer in communication with the processing layer and converting the measurement data into a sensor-type-independent format; and
   a fusion layer in communication with the measurement abstraction layer and receiving the measurement data, said fusion layer including an equations of motion module which computes platform equations of motion based on the translational acceleration and angular rotational rate data from the IMU and a gravity model, and a fusion module which performs a fusion calculation on the measurement data and the platform equations of motion to produce a platform navigation state including platform position, velocity and attitude.

2. The navigation system according to claim 1 wherein the fusion module performs the fusion calculation using a Kalman filter, an unscented Kalman filter or a square root filter, and the fusion calculation also produces error estimates including IMU error and sensor alignment error.

3. The navigation system according to claim 1 further comprising a feedback channel providing the platform navigation state from the fusion layer to the processing layer to improve accuracy of the measurement data produced by processing the sensor signals.

4. The navigation system according to claim 1 further comprising an output channel from the fusion layer, where the output channel provides the platform navigation state to a control system which controls movement of the mobile platform.

5. The navigation system according to claim 1 wherein the sensors include one or more of a camera, an infrared sensor, a lidar sensor, a radar sensor, a celestial sensor, a magnetic compass, a radio navigation receiver, a Global Positioning System (GPS) receiver, and a barometric altimeter.

6. The navigation system according to claim 1 wherein the processing layer uses pre-loaded databases when processing the sensor signals to produce the measurement data, including one or more of Digital Terrain Elevation Data (DTED), digital maps, and a landmarks and features database.

7. The navigation system according to claim 1 wherein the processing layer includes one or more of an optical flow module for computing a velocity of the platform, a structure from motion module for identifying three-dimensional features on land from a sequence of sensor-provided images, a geo-registration module for matching a sensor-provided image to a reference image, and a feature tracking module for computing a position of the platform.

8. The navigation system according to claim 7 wherein the measurement data includes one or more of a position, a velocity and an attitude of the mobile platform resulting from calculations performed in the modules in the processing layer.

9. The navigation system according to claim 1 wherein the mobile platform is an airborne weapon.

10. The navigation system according to claim 1 wherein the mobile platform is an aircraft, including either a manned aircraft or an unmanned aerial vehicle (UAV).

11. The navigation system according to claim 10 further comprising a shipboard navigation system onboard a ship at sea upon which the aircraft is preparing to land, where the navigation system onboard the aircraft is in communications with the shipboard navigation system, and fusion module in the navigation system onboard the aircraft computes both an absolute navigation state of the aircraft and a relative navigation state of the aircraft with respect to the ship.

12. The navigation system according to claim 11 wherein the sensors onboard the aircraft include sensors which detect features of the ship used in the processing layer to compute a position and attitude of the ship with respect to the aircraft.

13. The navigation system according to claim 1 wherein the mobile platform is a ground vehicle.

14. The navigation system according to claim 1 wherein the mobile platform is a dismounted soldier, the sensors include hand-held sensors, and the measurement data includes individual measurements from the hand-held sensors.

15. The navigation system according to claim 1 wherein a plurality of the sensors are available on the mobile platform, different sensors are active during different portions of a platform mission, and the fusion module adaptively responds to changes in type of the measurement data provided during the mission.

16. An adaptive navigation system on an airborne platform, said navigation system comprising:
   a plurality of sensors onboard the airborne platform, said sensors providing sensor signals;
   an inertial measurement unit (IMU) onboard the airborne platform, said IMU providing translational acceleration and angular rotational rate data about the airborne platform; and
   a computer onboard the airborne platform having a processor, memory and storage, said computer being configured with;
   a sensing layer in communication with the one or more sensors and receiving the sensor signals;
   a processing layer in communication with the sensing layer and including software modules for determining what type of sensor signals are available, and processing the sensor signals to produce measurement data usable for navigation calculations, where the measurement data includes one or more of a position, a velocity and an attitude of the airborne platform;
   a measurement abstraction layer in communication with the processing layer and converting the measurement data into a sensor-type-independent format; and
   a fusion layer in communication with the measurement abstraction layer and receiving the measurement data, said fusion layer including an equations of motion module which computes platform equations of motion based on the translational acceleration and angular rotational rate data from the IMU and a gravity model, and a fusion module which performs a fusion calculation on the measurement data and the platform equations of motion to produce a platform navigation state including platform position, velocity and attitude, where different sensors are active during different portions of a platform mission, and the fusion module adaptively responds to changes in type of the measurement data provided during the mission.

17. The navigation system according to claim 16 further comprising a shipboard navigation system onboard a ship at sea upon which the airborne platform is preparing to land, where the navigation system onboard the airborne platform is in communications with the shipboard navigation system; and fusion module in the navigation system onboard the airborne platform computes both an absolute navigation state of the airborne platform and a relative navigation state of the airborne platform with respect to the ship.

18. The navigation system according to claim 16 wherein the airborne platform is an airborne weapon.

19. The navigation system according to claim 16 wherein the plurality of sensors includes a radar sensor which is only activated during a terminal portion of the mission.

20. A method for providing adaptive navigation on a mobile platform, said method comprising:

providing one or more sensors onboard the mobile platform, said sensors providing sensor signals;

providing an inertial measurement unit (IMU) onboard the mobile platform, said IMU providing translational acceleration and angular rotational rate data about the mobile platform;

receiving the sensor signals, by a computer onboard the mobile platform having a processor, memory and storage;

processing, by the computer, the sensor signals to produce measurement data usable for navigation calculations;

converting, by the computer, the measurement data into a sensor-type-independent format;

computing, by the computer, platform equations of motion based on the translational acceleration and angular rotational rate data from the IMU and a gravity model; and performing a fusion calculation, by the computer, on the measurement data and the platform equations of motion to produce a platform navigation state including platform position, velocity and attitude.

\* \* \* \* \*